US012603917B2

(12) United States Patent
Ballew et al.

(10) Patent No.: US 12,603,917 B2
(45) Date of Patent: Apr. 14, 2026

(54) SYSTEMS AND METHODS FOR IP SPOOFING SECURITY

(71) Applicant: CenturyLink Intellectual Property LLC, Broomfield, CO (US)

(72) Inventors: Dean Ballew, Sterling, VA (US); John R.B. Woodworth, Amissville, VA (US); John A. Schiel, Arvada, CO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 269 days.

(21) Appl. No.: 17/657,381

(22) Filed: Mar. 31, 2022

(65) Prior Publication Data

US 2022/0329625 A1      Oct. 13, 2022

Related U.S. Application Data

(60) Provisional application No. 63/172,974, filed on Apr. 9, 2021.

(51) Int. Cl.
*H04L 29/06* (2006.01)
*H04L 9/40* (2022.01)

(52) U.S. Cl.
CPC ...... *H04L 63/1483* (2013.01); *H04L 63/0236* (2013.01)

(58) Field of Classification Search
CPC ............. H04L 63/1483; H04L 63/0236; H04L 63/1425; H04L 43/0817; H04L 41/00; H04L 29/06244; H04L 29/06265; H04L 29/06884; H04L 29/06979; H04L 29/08144; H04L 43/062; H04L 47/745; H04L 63/1408; H04L 63/20; H04L 63/205; H04L 65/00; H04L 67/1002; H04L 29/06585; H04L 29/12386; H04L 41/08; H04L 29/12783; H04L 9/0833; H04L 9/088; H04L 45/26; H04L 29/08576; H04L 29/12735; H04L 45/60; G01N 2035/00881; G01R 31/318378; G01V 5/0083; G05B 2219/33333; G05B 2219/33244; G01C 21/3492; H04B 7/15521; H04B 7/2696;
(Continued)

(56) References Cited

U.S. PATENT DOCUMENTS

| 2003/0195984 | A1* | 10/2003 | Zisapel | ................... | G06F 9/505 |
| | | | | | 709/238 |
| 2008/0040275 | A1* | 2/2008 | Paulsen | .................. | G06Q 40/04 |
| | | | | | 705/37 |
| 2010/0103837 | A1* | 4/2010 | Jungck | ................ | H04L 61/4511 |
| | | | | | 370/252 |

* cited by examiner

*Primary Examiner* — Amir Mehrmanesh
*Assistant Examiner* — Leynna Truvan

(57) ABSTRACT

Examples of the present disclosure describe systems and methods for providing security against IP spoofing. In aspects, network traffic associated with one or more data requests may be received by a device in a computing environment. The network traffic may be evaluated using one or more automated logic systems or algorithms to identify suspicious or malicious behavior. The automated logic systems or algorithms may implement one or more analyses, such as asymmetric routing analysis, hardware device analysis, user and/or network behavior analysis, etc. Upon identifying suspicious or malicious behavior, the automated logic systems or algorithms may apply a filter to one or more computing devices. For example, a filter for blocking network traffic associated with the suspicious or malicious behavior may be applied to a computing device that is in close geographic and/or logical proximity to an attacking computing device.

19 Claims, 4 Drawing Sheets

(58) Field of Classification Search
CPC ......... H04N 21/2668; H04N 21/23113; H04N
21/64738; H04N 21/64784; H04M
15/8214; H04M 2215/782; H04W
12/1006; H04W 12/106; H04Q
2213/13196; G06F 3/1231
See application file for complete search history.

Processing Environment

Monitoring Component — 202

Evaluation Engine — 204

Decision Logic — 206

Device Identification Engine — 208

Filtering Mechanism — 210

200

SYSTEMS AND METHODS FOR IP SPOOFING SECURITY

CROSS-REFERENCE TO RELATED APPLICATIONS

This application claims the benefit of U.S. Provisional Application No. 63/172,974 filed Apr. 9, 2021, entitled "Systems and Methods for IP Spoofing Security," which is incorporated herein by reference in its entirety.

BACKGROUND

Internet Protocol (IP) spoofing is the creation of IP packets that have modified source information (e.g., source IP address or source media access control (MAC) address) in order to conceal the identity of the sender or impersonate an alternate computing device. Although legitimate reasons to use IP spoofing exist, IP spoofing is frequently used for malicious reasons, such as to perform cyberattacks. To combat the malicious uses of IP spoofing, a host of a web server and other data-providing device implements security features to filter malicious network traffic. However, these security features are based on unsophisticated rules and logic that are unable to distinguish between legitimate and malicious network traffic. Moreover, these security features are often applied only after the malicious network traffic has been received by the web server (or intended recipient device) or a response has been delivered to the impersonated computing device.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for providing security against IP spoofing. In aspects, network traffic associated with one or more data requests may be received by a device in a computing environment. The network traffic may be evaluated using one or more automated logic systems or algorithms to identify suspicious or malicious behavior. The automated logic systems or algorithms may implement one or more analyses, such as asymmetric routing analysis, hardware device analysis, user and/or network behavior analysis, etc. Upon identifying suspicious or malicious behavior, the automated logic systems or algorithms may apply a filter to one or more computing devices. For example, a filter for blocking network traffic associated with the suspicious or malicious behavior may be applied to a computing device that is in close geographic and/or logical proximity to an attacking computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
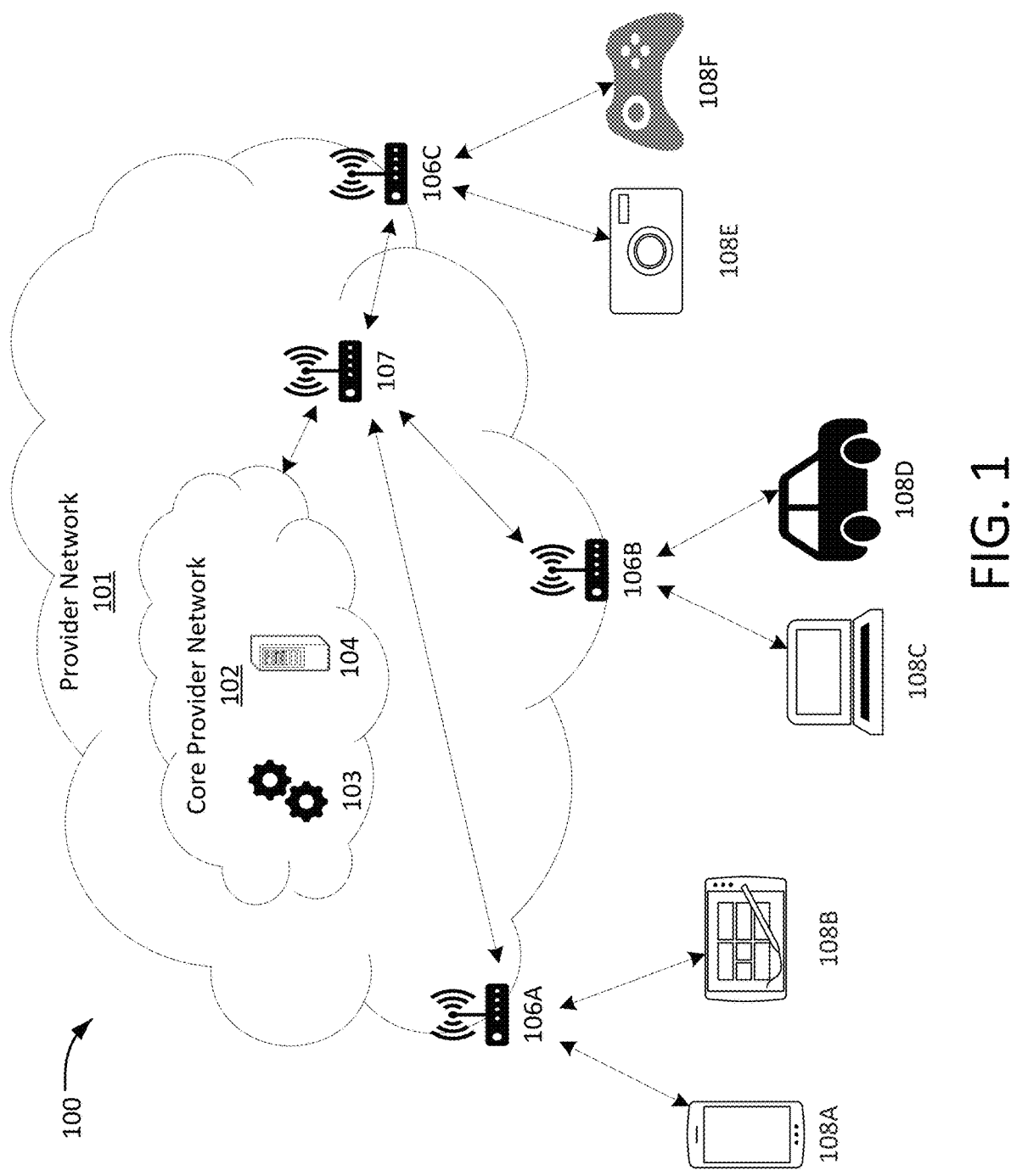
FIG. 1 illustrates an example system for providing security against IP spoofing.

The Internet Protocol specifies that each IP packet must include a header containing (among other things) a source IP address. The source IP address identifies the IP address of the sender of the IP packet. IP spoofing is the creation of IP packets which have a modified source address in order to either hide the identity of the sender, to impersonate another computer system, or both. When a source IP address has been modified, the response to the IP packet is provided to the modified source IP address. Although legitimate reasons to use IP spoofing exist, IP spoofing is frequently used for cyberattacks, such as denial-of-service (DoS) attacks and distributed denial-of-service (DDoS) attacks. In such cyberattacks, a device having the modified source IP address is inundated with network traffic, which may cause the device (or services thereof) to become unavailable temporarily or indefinitely.

To combat the illegitimate uses of IP spoofing, various spoofing prevention approaches have been developed. One common approach is to implement a packet filtering component on a web server (or a device logically adjacent to the web server). The packet filtering component inspects packets received by the web server and blocks packets having the incorrect source information. For instance, the web server (or a service to which the web server subscribes) may collect network statistics about received source IP addresses and identify suspicious source IP addresses. The web server may then use one or more payload recognition mechanisms to evaluate the received source IP addresses and/or other network traffic. When a suspicious source IP address is identified, the packet filtering component may block or throttle network traffic from the source IP address.

In examples, the packet filtering components implemented by the web servers may be insufficient for several reasons. First, the packet filtering component may be engaged only after the network traffic has been received by the web server. As a result, bandwidth is unnecessarily used for the network traffic at every network hop between the attacking device and the web server. Second, the packet filtering component may require extensive computational resource (e.g., CPU, memory) usage by the webserver, which diminishes the request processing capacity of the web server. Third, the packet filtering component often uses unsophisticated rules and decision logic that are unable to accurately distinguish between legitimate and malicious network traffic. For instance, upon identifying a spoofed source IP address, a web server may simply block all traffic associated with the source IP address even though the majority of the network traffic originates from the actual source IP address. Fourth, the packet filtering components typically do not take the duration of an event (such as a cyberattack) into account when filtering network traffic. For instance, the packet filtering components may continue filtering network traffic significantly beyond termination of the event (or even permanently). Alternatively, the packet filtering components may cease filtering network traffic during a lull in network activity, which may occur before the event/attack has terminated.

To address, for example, one or more such issues with conventional spoofing prevention approaches, the present disclosure provides various systems and methods for providing IP spoofing security that is intelligent and proactive. In aspects, network traffic associated with one or more data requests may be received by a device in a computing environment. In at least one example, the computing environment may be an edge computing environment. In an edge computing environment, at least a portion of the data processing and data storage is moved from a centralized location (or core provider network) that is geographically and/or logically remote from the end user devices to locations geographically and/or logically closer to the end user devices ("edge locations"). This movement of data processing and data storage to edge locations mitigates data latency issues that can affect application performance and user experience, especially where real-time data is used/expected. This movement of data processing and data storage to edge locations also reduces the bandwidth costs for data, which can be based on the distance the data must travel from the consuming devices and applications to the data processing and storage location.

In some aspects, a device receiving the network traffic may be an edge device that is located at an edge location that operates as an ingress point for the network. For example, an edge router in an edge location may receive network traffic from one or more end user devices. The edge device may implement one or more network protocols for collecting network traffic information and monitoring network flow. The network traffic received by the device may be evaluated using one or more automated logic systems, algorithms, or models for identifying suspicious or malicious behavior, such as IP spoofing. A model, as used herein, may refer to a predictive or statistical utility or program that may be used to determine a probability distribution over one or more classes, objects, result sets or events, and/or to predict a response value from one or more predictors. A model may be based on, or incorporate, one or more rule sets, machine learning (ML), a neural network, or the like. The automated logic systems, algorithms, or models may be implemented on the edge device, a device that is geographically or logically adjacent to the edge device, a device having access to one or more edge devices, or some combination thereof. The evaluation of the network traffic may include, for example, asymmetric routing analysis, hardware analysis of (actual and spoofed) sending devices, and user and/or network behavior analysis, among others. Based on the evaluation of the network traffic, the automated logic systems, algorithms, or models may provide one or more outputs. The outputs may provide an indication of a threat or suspicion level, a type of event, a duration of an event, a deviation from expected behavior, and/or a recommended action, among others.

Based on output of the automated logic systems, algorithms, or models, a determination may be made to filter the received network traffic. For example, if an output suspicion level for received network traffic exceeds a predefined suspicion threshold, a determination may be made to filter the received network traffic. When such a determination is made, a device to which a packet filter may be applied ("filter device") may be identified. To identify a filter device, one or more devices along the transmission path of the network traffic may be identified. For example, network hop data associated with the network traffic may be used to identify a transmission path between a receiving device ("ingress device") representing an ingress point of the network traffic to a computing environment and an endpoint device of the computing device (e.g., a web server or other data retrieval device/service). The transmission path may include the ingress device, one or more intermediate devices (such as routers, switches, etc.), and the endpoint device. The ingress device or a device that is geographically or logically close to the ingress device may be selected as the filter device. A filter for blocking the network traffic from the sender may be applied to the selected filter device. In such an example, the network traffic of a sender that is using a spoofed IP address may be blocked by the filter device while legitimate network traffic from the actual (non-spoofed) IP address is not blocked.

After applying a filter to the filter device, the automated logic systems, algorithms, or models may continue to monitor network traffic that is being filtered by the filter device. When the network traffic is no longer a threat or suspicious (e.g., the IP packets are no longer being spoofed by the sender), the filter on the filter device may be removed, disabled, or modified to enable a portion of the network traffic to be sent to the destination. This dynamic reevaluation and/or removal of an applied filter enables the filter device to deallocate computing resources previously allocated to the filter. In some instances, such computing resources are substantial and may result in a significant improvement to the processing of the filter device when no longer allocated to the filter.

Accordingly, the present disclosure provides a plurality of technical benefits including but not limited to: enhanced IP spoofing detection, providing security decisions near computing environment ingress points and/or attacking devices, reducing network traffic bandwidth, reducing computational resource usage of computing environment endpoints (such as web servers), significantly enhancing automated packet filtering intelligence, localizing the impact of packet filtering to targeted devices (e.g., attackers), and dynamically disabling or removing filters that are no longer needed (thereby, freeing computational resources), among others.

Figure 4:
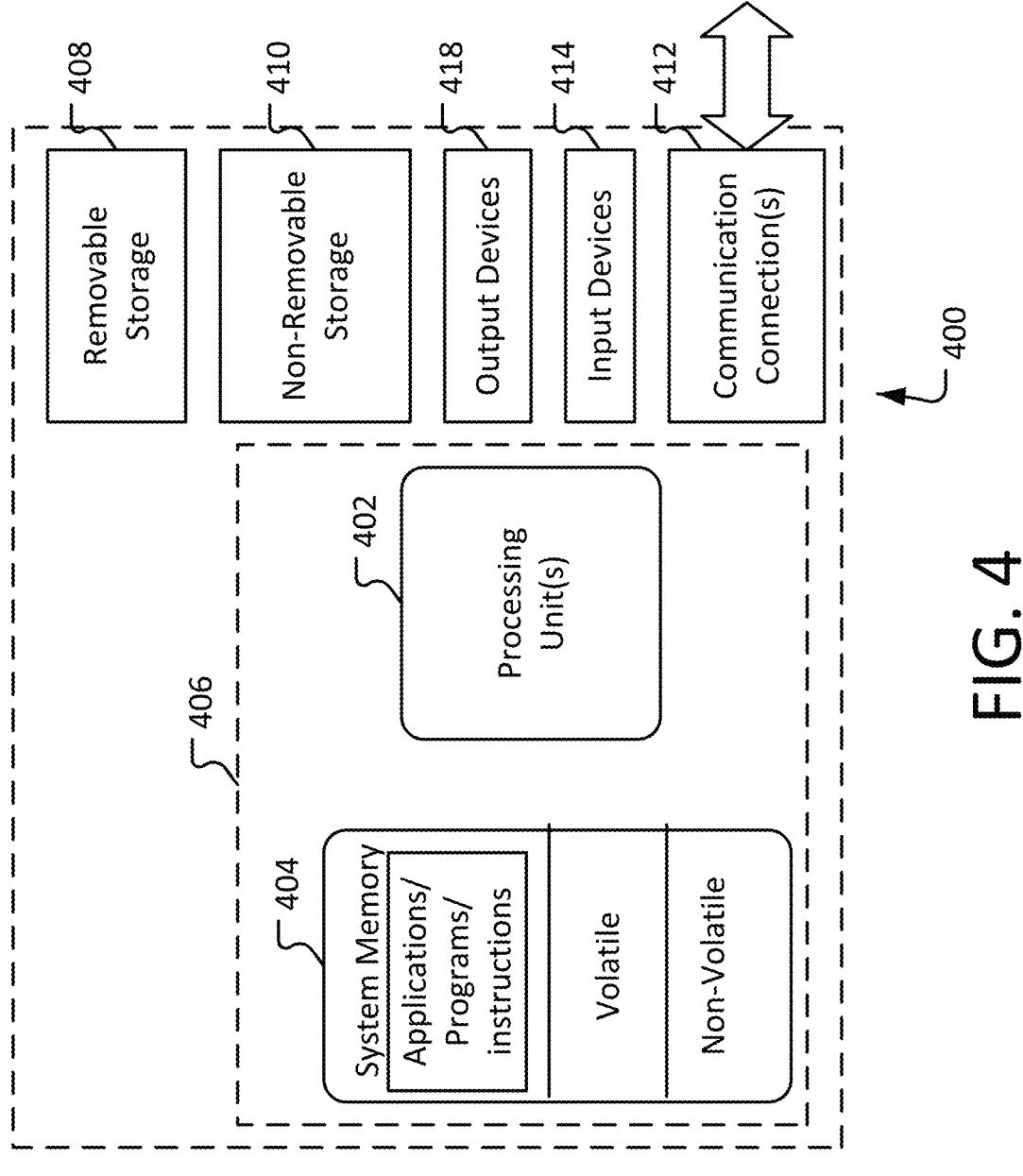
FIG. 4 illustrates one example of a suitable operating environment in which one or more of the present embodiments may be implemented.

FIG. 1 illustrates an overview of an example system for providing IP spoofing security. Example system 100 as presented is a combination of interdependent components that interact to form an integrated system. Components of system 100 may be hardware components or software components implemented on and/or executed by hardware components of the system. System 100 may provide an operating environment for software components to execute according to operating constraints, resources, and facilities of system 100. In one example, the operating environment and/or software components may be provided by a single processing device, as depicted in FIG. 4. In another example, the operating environment and software components of systems may be distributed across multiple devices. For instance, input may be entered on a user device and information may be processed or accessed using other devices in a network, such as one or more network devices and/or server devices.

In FIG. 1, system 100 comprises provider network 101, core provider network 102, orchestration mechanism 103, resource(s) 104, edge nodes 106A, 106B, 106C (collectively "edge node(s) 106"), intermediate node(s) 107, and user devices 108A, 108B, 108C, 108D, and 108E (collectively "user device(s) 108"). One of skill in the art will appreciate that the scale of systems such as system 100 may vary and may include more or fewer components than those described in FIG. 1. For instance, in some examples, the functionality and components of orchestration mechanism 103 and edge node(s) 106 may be integrated into a single processing device, system, or environment. Alternatively, the functionality and components of orchestration mechanism 103 may be distributed across multiple edge environments, core network processing systems, user devices, and/or cloud networks.

Provider network 101 may be configured to deliver various computing services (e.g., applications, storage, processing power) over one or more networks, such as the Internet, private networks, Wide Area Networks (WANs), etc. Provider network 101 may comprise numerous hardware and/or software components and may be subject to one or more computing models (e.g., Software as a Service (SaaS), Platform as a Service (PaaS), Infrastructure as a Service (IaaS)). In aspects, provider network 101 may comprise core provider network 102, orchestration mechanism 103, resource(s) 104, edge node(s) 106, and intermediate node(s) 107.

Core provider network 102 may be configured to provide data processing components (e.g., storage components, security components, analytical components, processing components) for processing user requests for the various computing services provided by provider network 101. In some aspects, core provider network 102 may be implemented as part of an edge computing architecture. For example, core provider network 102 may be implemented in one or more centralized geographical and/or logical locations. At least a portion of the computational and data storage requirements for processing the various computing services of provider network 101 may be moved or distributed from the centralized location(s) to locations that are nearer (geographically and/or logically) to the end user devices requesting the computing services.

Orchestration mechanism 103 may be a hardware device (or a component thereof) or a software component (e.g., a computing service, an application, an API, or the like) that is configured to monitor network traffic associated with provider network 101. For example, orchestration mechanism 103 may utilize a data monitoring utility that monitors network traffic transmitted between an end user device and one or more data resources accessible to provider network 101, such as resource(s) 104.

Resource(s) 104 may comprise or provide access to one or more documents, files, or other content. Examples of resource(s) 104 may include, but are not limited to, web servers, application servers, databases, flat files, and streaming data services. Although resource(s) 104 are described as being comprising part of core provider network 102, alternative configurations are contemplated. For example, resource(s) 104 may be moved to or located at an edge location. In such an example, one or more of resource(s) 104 may be located near or in the same location as one or more of edge node(s) 106.

The data monitoring utility may implement one or more mechanisms for collecting network traffic information and monitoring network flow and volume. Although FIG. 1 depicts orchestration mechanism 103 as being located in core provider network 102, it is contemplated that orchestration mechanism 103 may be located externally to core provider network 102. For example, orchestration mechanism may be implemented by one or more edge node(s) 106, intermediate node(s) 107, a device adjacent thereto, or any other device within provider network 101. In aspects, orchestration mechanism 103 may comprise or provide access to an automated logic component. The automated logic component may be used to identify suspicious or malicious behavior, such as IP spoofing, in network traffic received by provider network 101. The automated logic component may also provide for implementing packet filtering on one or more devices within provider network 101. The packet filtering may block suspicious or malicious network traffic from one or more end user devices.

Edge node(s) 106 may provide an entry point into enterprise or service provider core networks, such as provider network 101, or control data flow between two networks. Generally, edge node(s) 106 may be designed to fulfill specific roles and may be configured with applications and/or services to accomplish specific tasks relating to the various computing services provided by provider network 101. Examples of edge node(s) 106 may include gateway routers, server devices, switches, routers, routing switches, integrated access devices, multiplexers, etc. In edge computing environments, edge node(s) 106 may be deployed in one or more edge environments. The edge environments may be configured to deliver various computing services over one or more networks to users of a specific geographical region or area (e.g., country, state, city, neighborhood, building). Accordingly, edge environments may be established or located in regions or areas that are geographically (and/or logically) near one or more users or end user devices. For example, a first edge environment may be established in close geographical proximity to a first set of users in a first city and a second edge environment may be established in close geographical proximity to a second set of users in a second city. The first edge environment may provide increased response times for data requests provided by the first set of users, and the second edge environment may provide increased response times for data requests provided by the second set of users.

Intermediate node(s) 107 may be configured to transfer network traffic between edge node(s) 106 and resource(s) 104 (and/or any other component of provider network 101). Examples of intermediate node(s) 107 may include gateway routers, server devices, switches, routers, routing switches, integrated access devices, multiplexers, etc. Although FIG. 1 depicts intermediate node(s) 107 as being a single network hop between edge node(s) 106 and core provider network 102, it is contemplated that intermediate node(s) 107 may represent a plurality of network hops between edge node(s) 106 and core provider network 102. In edge computing environments, intermediate node(s) 107 may be located externally to edge environments of provider network 101. For instance, intermediate node(s) 107 may transmit network traffic received by the edge nodes of one or more edge environments to resource(s) 104.

User device(s) 108 may represent various end user devices and/or internet of things (IoT) devices that are configured to interact with the various computing services provided by provider network 101. For example, user device(s) 108 may provide data requests to and/or receive result data from resource(s) 104. Examples of user device(s) 108 include, but are not limited to, personal computers (PCs), mobile devices (e.g., smartphones, tablets, laptops, personal digital assistants (PDAs)), and wearable devices (e.g., smart watches, smart eyewear, fitness trackers, smart clothing, body-mounted devices. Accordingly, user device(s) 108 may include sensors, applications, and/or services for receiving or collecting input from users. Examples of sensors include microphones, touch-based sensors, keyboards, pointing/selection tools, optical/magnetic scanners, accelerometers, magnetometers, gyroscopes, etc.

The collected input may include, for example, voice input, touch input, text-based input, gesture input, video input, and/or image input.

In edge computing environments, the response times and/or bandwidth usage for data requests provided by user device(s) 108 may vary depending on the distance (geographic or logical) between user device(s) 108 and a corresponding edge environment. For instance, the response time for fulfilling a data request may increase and/or the bandwidth usage for the data request may decrease as the distance between user device(s) 108 and an edge environment decreases. As a result, when a first user device is geographically or logically nearer to an edge environment than a second user device, the response time for a data request provided to the edge environment by the first device may be faster than the response time for a data request provided to the edge environment by the second device. Alternatively, the response times for data requests provided by all devices within a geographical or logical region may be approximately similar or within a specific range of time.

Figure 2:
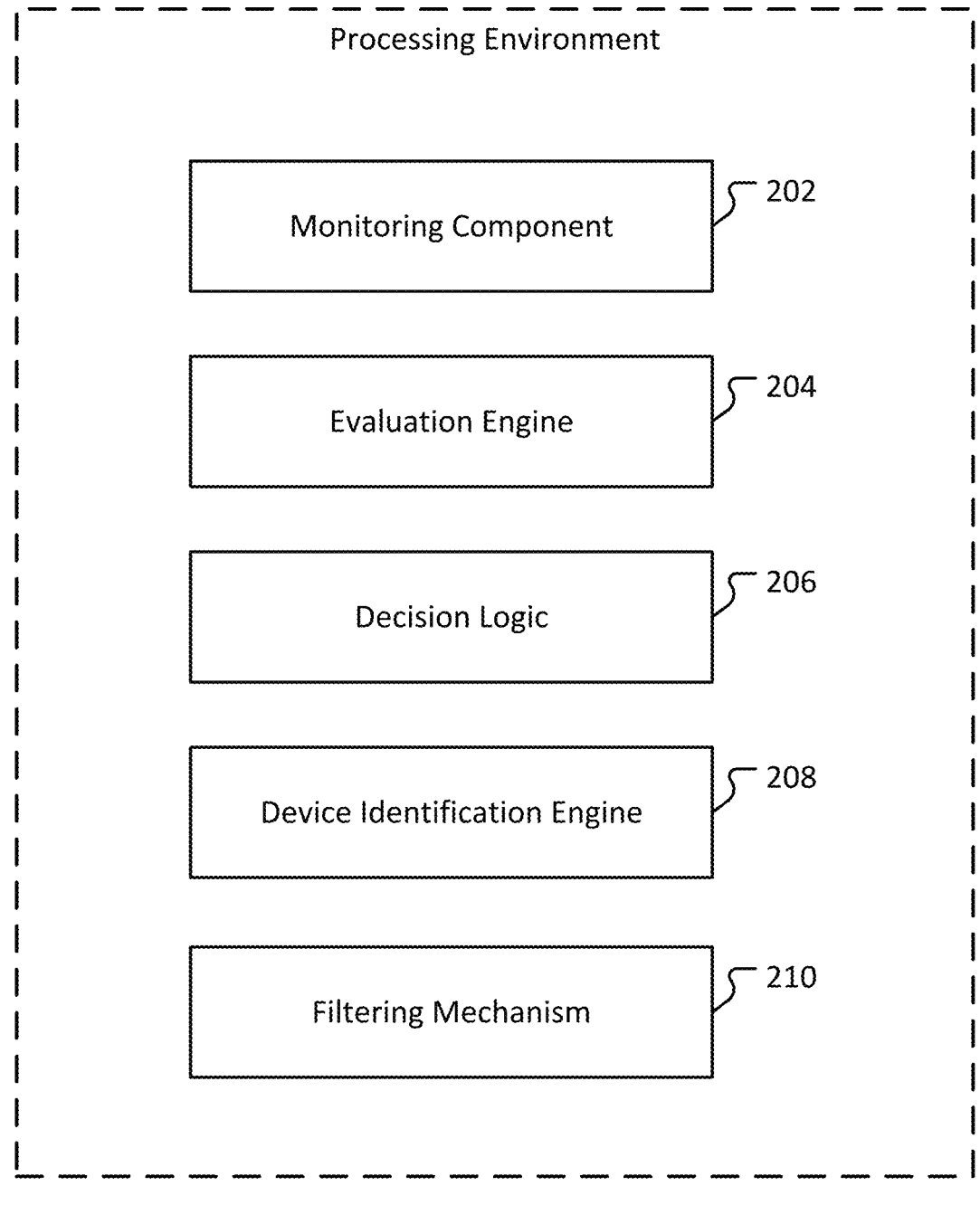
FIG. 2 illustrates an example processing environment for providing security against IP spoofing.

FIG. 2 illustrates an example processing environment 200 for providing security against IP spoofing as described herein. The techniques implemented by processing environment 200 may comprise the devices, systems, techniques and data described in system 100 of FIG. 1. Although examples in FIG. 2 and subsequent figures will be discussed in the context of edge computing environments, it is contemplated that the examples are also applicable to other contexts, such as cloud computing environments. In some examples, one or more components of processing environment 200 (or the functionality thereof) may be distributed across multiple devices. In other examples, a single device may comprise the components of processing environment 200.

In FIG. 2, processing environment 200 comprises monitoring component 202, evaluation engine 204, decision logic 206, device identification engine 208, and filtering component 210. One of skill in the art will appreciate that the scale of processing environment 200 may vary and may include additional or fewer components than those described in FIG. 2. In aspects, some, all, or none of processing environment 200 may be implemented in an edge computing environment. In edge computing environments, processing environment 200 may provide geographically localized applications and/or services for a core network or core computing environment, such as core provider network 102. As compared to the core network, processing environment 200 may provide improved processing power, data storage, and/or data security for users located near processing environment 200.

Monitoring component 202 may be configured to receive and/or detect network traffic transmitted between one or more end user devices and one or more applications, services, and/or devices of processing environment 200. For example, monitoring component 202 may monitor network traffic between an end user device and an edge router device of processing environment 200. In aspects, monitoring component 202 may implement a network protocol, such as NetFlow, for collecting network traffic information and monitoring network flow and volume. The collected network traffic information may include, among other things, input (ingress) interface, output (egress) interface, source IP address, destination IP address, IP protocol, source port, destination port, type of service value, next-hop IP address, byte and packets counts, and timestamps for network traffic flow start and end times. The collected network traffic information (or a portion thereof) may be added to one or more IP packets in the network traffic. Alternatively, a network flow record comprising the collected network traffic information (or a portion thereof) may be created and stored by monitoring component 202 or an alternate component of processing environment 200. Although specific reference to NetFlow is provided herein, alternate network protocols are contemplated.

Evaluation engine 204 may be configured to evaluate received network traffic. In aspects, evaluation engine 204 may be provided (or otherwise have access to) the received network traffic information. Evaluation engine 204 may evaluate the received network traffic information using one or more artificial intelligence (AI), machine learning (ML), or other logic mechanisms, such as decision trees, logistic regression, support vector machines (SVM), k-nearest-neighbor (KNN) algorithms, neural networks, Naïve Bayes classifiers, linear regression, k-means clustering, or the like. The evaluation may be performed in real-time, at one or more predefined intervals, and/or upon user demand. The evaluation of the received network traffic may include identifying asymmetrically routed network traffic and/or analyzing user and network behavior patterns. As one example, evaluation engine 204 may determine when the source information (e.g., source IP address or source hardware identifier) for a sending device has been modified. Determining that source information has been modified may include identifying a device representing an ingress point for an IP packet to a computing environment ("ingress device") and identifying a device representing an egress point for response data from the computing environment ("egress device"). In examples, the ingress device may be identified using the collected network traffic information for a received IP packet, such as the ingress interface, network hop IP addresses, etc. The egress device may also be identified using the collected network traffic information for response data transmitted to a source IP address, such as the egress interface, network hop IP addresses, etc. Alternatively, the egress device may be identified prior to transmitting response data to a source IP address by comparing the source IP address to IP routing table information. The IP routing table information may provide the expected egress device for a specified source IP address. When the ingress device does not match the expected egress device, evaluation engine 204 may determine that the network traffic is asymmetrically routed.

Alternatively, evaluation engine 204 may compare the source information listed in the header of an IP packet to one or more external information sources. As one example, evaluation engine 204 may use an IP address lookup utility or service to search for the source IP address listed in the header of the IP packet. The IP address lookup utility or service may indicate the expected geographic location of the searched source IP address. As another example, evaluation engine 204 may compare a source IP address to a provisioning database that identifies the geographic region (or geographic regions in multi-homed examples) in which the source IP address is registered or authorized. Based on the geographic location indicated by the external information source(s), evaluation engine 204 may be able to determine whether the geographic location associated with the received source IP address is consistent with the geographic location from which the network traffic was received. For instance, an ingress device may be configured to receive network traffic from users in Colorado. Evaluation engine 204 may use an IP address lookup utility to determine that an IP packet received by the ingress device comprise a source IP address for a device in New York. Based on determining that the location of the ingress device for the IP packet (i.e., Colorado) does not match the location of the egress device for the response data (i.e. New York), evaluation engine 204 may determine that the network traffic is asymmetrically routed.

As another example, evaluation engine 204 may identify when behavioral patterns associated with source information listed in the header of the IP packet has been modified. Identifying that behavioral patterns have been modified may include deriving contextual data for a user and/or user device from the received network traffic information. Contextual data may include, but is not limited to, date/time information, geolocation information, event classification, activity frequency, user identifying information, device identifying information, content topics, content style or format, and application or service entry points. The derived contextual data may be compared to previously collected or stored contextual data for the user or user device. For instance, evaluation engine 204 may access a stored collection of data comprising network event data (e.g., logins, logoffs, warnings, transactions, transaction types) for a source IP address or MAC address. The network event data may also comprise or be associated with contextual data. The contextual data for the network event data may be derived using evaluation engine 204 or an alternate logic or evaluation utility/service. The derived contextual data for the received network traffic information may be compared to the stored collection of data to determine that the received network traffic information represents anomalous behavior for the source IP address or MAC address.

Decision logic 206 may be configured to determine whether to filter the received network traffic. In aspects, decision logic 206 may implement artificial intelligence (AI), machine learning (ML), or other logic mechanisms. Decision logic 206 may compare the output or evaluation results of evaluation engine 204 to comparison data, such as values, value ranges, data labels, or thresholds. Based on the comparison of the output or evaluation results to the comparison data, decision logic 206 may generate a network traffic flow decision. Examples of network traffic flow decisions may include, but are not limited to, filter network traffic, do not filter network traffic, throttle network traffic, queue network traffic, or redirect network traffic. As one example, decision logic 206 may receive an indication from evaluation engine 204 that received network traffic from a sending device is indicative of IP spoofing. Based on the indication, decision logic 206 may determine to filter future network traffic received from the sending device. As another example, decision logic 206 may receive a value indicating a recent 1000% increase in network traffic from a source IP address. The value (i.e., 1000%) may be compared to a traffic increase threshold that is set to, for instance, 750%. The traffic increase threshold may represent a percentage increase in network traffic that, if exceeded for a predefined amount of time (e.g., 20 seconds), is typically indicative of malicious conduct. Based on a comparison of the value to the traffic increase threshold, decision logic 206 may determine to throttle the received network traffic for a period of time.

Device identification engine 208 may be configured to identify a device upon which to apply a filter. In aspects, device identification engine 208 may receive a network traffic flow decision from decision logic 206. Based on the network traffic flow decision, device identification engine 208 may identify one or more devices along the transmission path of the received network traffic. Examples of devices include server devices, routers, routing switches, network interface cards (NICs), integrated access devices, multiplexers, etc. In at least one example, the device may be virtualized in a software-defined network environment (SDN). Identifying the device(s) may include using the collected network traffic information (such as network hop data, actual source IP address or device identifier, ingress and egress interface, etc.), a network trace utility, or an alternate network evaluation utility/service. Upon identifying the device(s), device identification engine 208 may determine which of the identified devices is configured with the processing capability to perform the required filtering operations. Device identification engine 208 may then select the device that is capable of performing the required filtering operations and is nearest in geographic or logical proximity to the ingress device. In some examples, the selected device may be the ingress device. In at least one aspect, the selection by the device by identification engine 208 may be additionally or alternatively based on whether the device is accessible by one or more components of processing environment 200, such as filter component 210. In examples, the access required by the components of processing environment 200 to the selected device may include the ability to modify IP routing tables, apply IP address or port filters, or otherwise selectively restrict network traffic flow. For example, device identification engine 208 may select as the filter device the ingress gateway, switch, and/or router that provides the sending device access to processing environment 200. One or more components of processing environment 200 may be authorized to modify an IP routing table of the ingress device. For example, the IP routing table of the ingress device may be modified to direct spoofed packets to a honeypot or dead server location.

Filter component 210 may be configured to implement a filter mechanism on a selected device ("filter device"). Implementing the filter mechanism may include modifying one or more files, a software configuration, or one or more hardware elements of a filter device. The filter mechanism may filter at least a portion of the network traffic for one or more devices associated with a sending device or a source IP address. In aspects, the filter mechanism applied to a filter device may be geographically or logically localized to a sending device or source IP address. For example, a filter mechanism applied to a filter device may block network traffic from a particular source IP address only when the network traffic is received from a particular geographic region or received by a particular ingress router. In such as an example, the filter mechanism may be applied to a plurality of filter devices within or corresponding to a plurality of regions serviced by processing environment 200. As a result, legitimate network traffic that is received for the source IP address from alternate geographic regions or by alternate ingress routers may not be blocked by the filter device(s).

In some aspects, after a filter mechanism has been applied to a filter device by filter component 210, evaluation engine 204 may continue to evaluate network traffic that is sent by the sending device. For example, the network traffic that is blocked by the filter device may be stored and/or redirected to (or otherwise made accessible to) evaluation engine 204. Evaluation engine 204 may continue to evaluate the network traffic until the condition or event that caused the filter to be applied to the filter device (e.g., asymmetric network traffic, anomalous user behavior, anomalous network behavior) is no longer active. In some examples, evaluation engine 204 may continue to evaluate the network traffic in real-time or at one or more predefined intervals. When the condition or event is no longer active, evaluation engine 204 may cause the applied filter to be disabled on or removed from the filter device. Disabling or removing the filter may free resources (e.g., CPU, memory, disk space) on the filter device. The freed resources may then be reallocated to increase the processing capabilities of the filter device. As a result, the continued evaluation of the network traffic by the sending device may enable a filter to be applied only for the duration of a detected condition or event.

Having described various systems that may be employed by the aspects disclosed herein, this disclosure will now describe one or more methods that may be performed by various aspects of the disclosure. In aspects, method 300 may be executed by system 100 of FIG. 1 or processing environment 200 of FIG. 2. However, method 300 is not limited to such examples. In other aspects, method 300 may be performed by a single device. In at least one aspect, method 300 may be performed by one or more components of a distributed network, such as a web service/distributed network service (e.g. cloud service).

Figure 3:
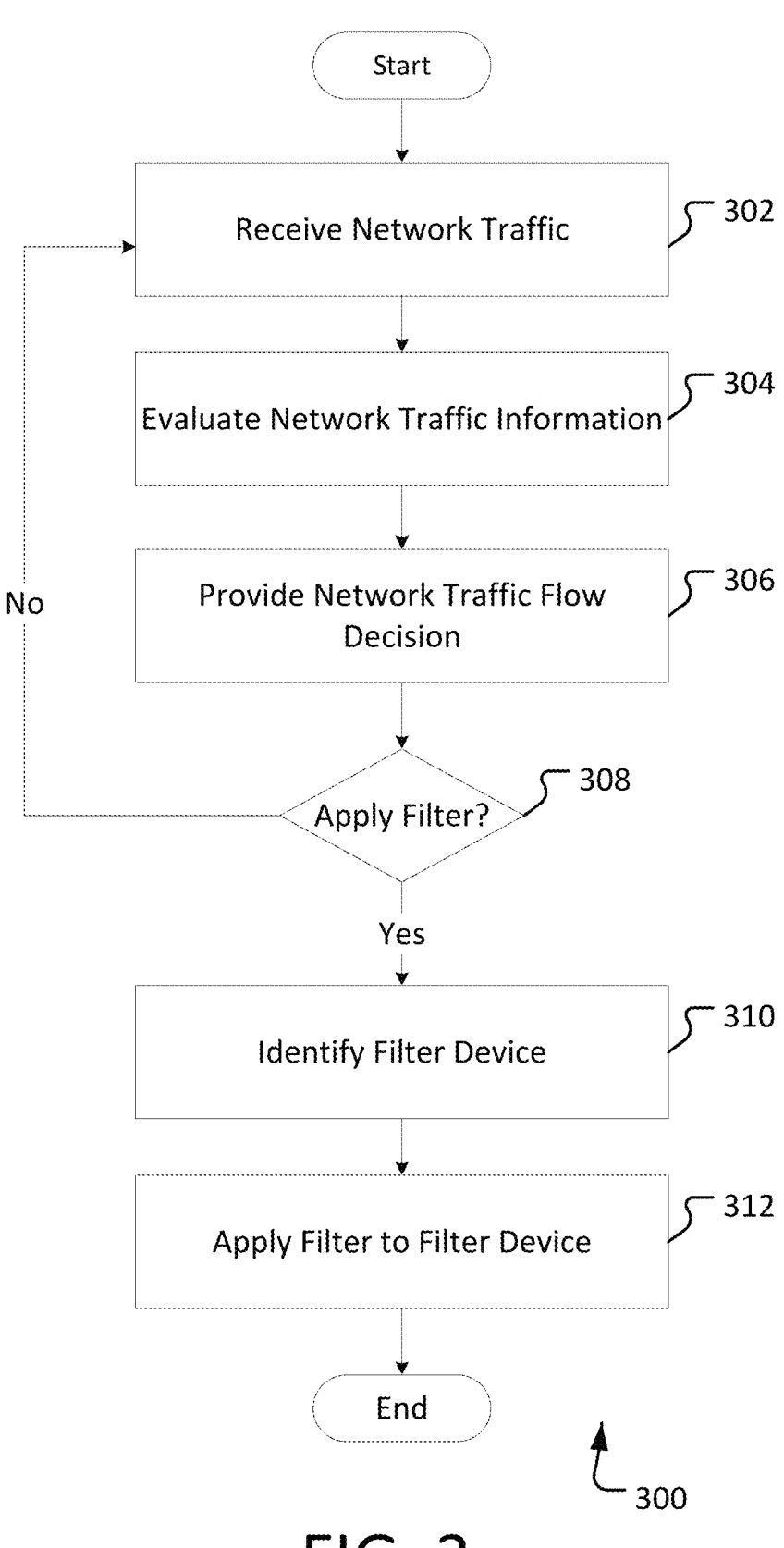
FIG. 3 illustrates an example method for providing security against IP spoofing.

FIG. 3 illustrates an example method 300 for providing IP spoofing security. Method 300 may be implemented by one or more devices in edge computing environments and/or devices within a core network. For example, portions of method 300 may be implemented by an orchestration component, such as orchestration mechanism 103. Alternatively, or in addition, portions of method 300 may be implemented by an edge computing device, such as edge node(s) 106 and/or intermediate node(s) 107, that is deployed in an edge location.

Method 300 begins at operation 302, where network traffic is received or detected. In aspects, an input detection component, such as monitoring component 202, may receive (or detect) network traffic transmitted between one or more end user devices, such as end user devices 108, and one or more applications, services, and/or devices. One or more of the applications, services, and/or devices may be implemented as part of an edge computing environment. The input detection component may implement a network protocol for collecting, enriching, and/or monitoring network traffic information. The collected network traffic information may include and/or be enriched with, among other things, ingress interface, egress interface, source IP address, destination IP address, IP protocol, source port, destination port, type of service value, next-hop IP address, byte and packets counts, and timestamps for network traffic flow start and end times.

At operation 304, the received network traffic information may be evaluated. In aspects, the received network traffic may be provided to an evaluation component, such as evaluation engine 204. The evaluation component may use one or more AI, ML, or alternate logic mechanisms to evaluate the received network traffic information. Evaluating the received network traffic information may include identifying asymmetrically routed network traffic and/or analyzing user and network behavior patterns. As one example, the evaluation component may obtain ingress router information and egress router information for network traffic received from a source IP address. Obtaining the ingress router information may comprise identifying network hop data in the network traffic information, implementing a network trace utility/service, evaluating network event files, or the like. Obtaining the egress router information may comprise evaluating IP routing tables, monitoring egress router traffic, evaluating network event files, or the like. For instance, the evaluation component may use the source IP address listed in the header of a received IP packet to interrogate the IP routing table of an edge router device ("ingress router") representing an ingress point to a computing environment. The IP routing table may identify the expected edge router device ("egress router") through which the data response to the IP packet will travel from the computing environment to the listed source IP address. When the ingress router does not match the egress router, the evaluation component may determine that the network traffic is asymmetric and may provide a corresponding output. The output may be numerical, text, or a combination thereof and may be presented visually, auditorily, haptically, or using any other presentation modality.

As another example, the evaluation component may have access to historical user and/or network behavioral data. The historical behavioral data may be collected or derived from historical network traffic information. Alternatively, the historical behavioral data may be collected from one or more alternate data sources, such as user data (e.g., user profile data, user account data, user preference data, user settings data), application data (e.g., user contact data, user communication data, user documents), IoT device data, social network data, and/or knowledge store data (e.g., web server data, document repositories). In some aspects, the historical behavioral data may be used to provide the evaluation component with an expected user and/or network behavior baseline. When current network traffic information is received, the evaluation component may collect or derive current behavioral data from the current network traffic information. The current behavioral data may be compared to the historical behavioral data to detect anomalous user and/or network behavior. For example, the historical behavioral data for a source IP address (or a user associated therewith) may indicate that network traffic is historically observed only between 5:30 p.m. and 8:30 p.m., always originates in Colorado, and never exceeds 50 requests in an hour. Current behavioral data for the source IP address may indicate that network traffic is being observed at 2:30 a.m., originates in New York, and exceeds 1,000 requests per minute. Based on these deviations from the historical behavioral data, the evaluation component may determine that the network traffic is anomalous. An output indicating or explaining the anomaly and/or the evaluated behavioral data may be generated.

At operation 306, a network traffic flow decision may be provided based on the evaluation by the evaluation component. In aspects, the output of the evaluation component may be provided to a decision component, such as decision logic 206. The decision component may compare the output to comparison data, such as values, value ranges, data labels, or thresholds. As one example, decision component may compare output indicating that network traffic is asymmetric to a ruleset. The ruleset may comprise one or more rules that each comprise one or more conditions and corresponding actions. For instance, the ruleset may comprise an "Asymmetric Traffic" rule having three condition/action pairs. The first condition/action pair may indicate that, if the received network traffic from a sending device is asymmetric (e.g., the ingress router is different from the egress router), a filter may be applied to block the future network traffic from the sending device. The second condition/action pair may indicate that, if the received network traffic from a sending device is not asymmetric (e.g., the ingress router is the same as the egress router) and the increase in network traffic is greater than or equal to 250%, the network traffic is to be filtered. The third condition/action pair may indicate that, if the received network traffic is not asymmetric and the increase in network traffic is less than 250%, the network traffic is not to be filtered.

Based on the comparison of the output to the comparison data, the decision component may generate a network traffic flow decision. The network traffic flow decision may indicate that network traffic should filtered, transmitted normally, throttled, queued, and/or redirected, among other options. In some aspects, the network traffic flow decision may be at least partly based on a confidence level associated with the output and/or a confidence level associated with the comparison of the output to the comparison data. For example, continuing from the above example, the first condition/action pair of "Asymmetric Traffic" rule may be assigned a confidence value of '100' on a scale of 0-100, where '100' indicates an absolute certainty that the network traffic should be filtered and '0' indicates an absolute lack of certainty the network traffic should be filtered. As a result of the high confidence value, the first condition/action pair may correspond to a decision to filter the network traffic flow.

The second condition/action pair may be assigned a confidence value of '75', where '100' indicates an absolute certainty that the network traffic should be filtered and '0' indicates an absolute lack of certainty the network traffic should be filtered. As a result of the lowered confidence score (as compared to the first condition/action pair confidence score), the second condition/action pair may correspond to a decision to redirect the network traffic flow to a testing environment for further evaluation. The additional evaluation in the testing environment may influence the confidence value higher or lower. A filtering decision may then be made based on the resulting confidence value.

The third condition/action pair may be assigned a confidence value of '90', where '100' indicates an absolute certainty that the network traffic should not be filtered and '0' indicates an absolute lack of certainty the network traffic should not be filtered. As a result of the relatively high confidence score (as compared to the first and second condition/action pair confidence score), the third condition/action pair may correspond to a decision to throttle the network traffic flow. Throttling the received network traffic flow may enable the received network traffic to be transmitted to the destination IP address while decreasing the volume of data packets transmitted per minute to the destination IP address. The percentage of data packets throttled may decrease in inverse proportion to the confidence value, such that a higher confidence value results in less throttling.

At decision operation 308, a decision may be made regarding whether to apply a filter to a device. The decision may be based on the network traffic flow decision. For example, if the traffic flow decision indicates that the received network traffic should be transmitted normally or throttled, a decision may be made to not apply a filter for the received network traffic. If no filter is to be applied, method 300 returns to operation 302. However, if the traffic flow decision indicates that the received network traffic should be filtered, queued, or redirected, a decision may be made to apply a filter for the received network traffic. If a filter is to be applied, method 300 proceeds to operation 310.

At operation 310, a filter device may be identified. In aspects, a device identification component, such as device identification engine 298, may be used to identify one or more devices and/or processing environments along the transmission path of the received network traffic. Identifying the device(s)/environment(s) may include using the collected network traffic information, network trace data, or other network evaluation data. For example, the ingress interface and network hop data listed in collected network traffic information may identify the ingress router and the nodes to be traversed to deliver the received network traffic to the destination IP address.

In aspects, the identified devices in the transmission path of the received network traffic may be ranked according to one or more criterion. As one example, the identified devices may be ranked according to the processing capability of the identified devices to perform the required filtering operations. For instance, one or more the identified devices may be configured with different hardware and/or software configurations. The devices having (comparatively) low processing power, low bandwidth, consistently heavy processing loads, and/or older hardware/software may be ranked lower than other higher performance devices. As another example, the identified devices may be ranked according to geographic and/or logical proximity to the ingress device. For instance, devices that are in closest proximity to the ingress device may be ranked highest, such that the rank of devices may decease as the number of hops away from the ingress device increases. As yet another example, the identified devices may be ranked according to device type. For example, router devices may be ranked higher than switch devices, which may be ranked higher than NICs.

Based on a ranking of one or more devices identified in the transmission path of the received network traffic, the device identification component may select one or more devices on which to apply a filter. For example, the device identification component may select to apply a filter only to an ingress device that received asymmetric network traffic from a device that is illegitimately using a source IP address (e.g., an attacking or spoofing device). Alternatively, the device identification component may select to apply a filter to every ingress device in a computing environment other than the ingress device(s) associated with a device that is legitimately using a source IP address (e.g., an attacked or spoofed device).

At operation 312, a filter mechanism may be applied to a device. In aspects, a filter applying component, such as filter component 210, may be used to apply a filter mechanism to a selected device ("filter device"). Implementing the filter mechanism on the filter device may include modifying one or more files, a software configuration, or one or more hardware elements of the filter device. For example, a router, switch, gateway, etc. ("ingress router") representing the ingress point to a computing environment for network traffic from a sending device may be selected as a filter device. The filter applying component may alter one or more network routes in an IP routing table of the ingress router to block network traffic from the sending device. Alternatively, the IP routing table may be altered to block only suspicious or malicious network traffic from the sending device. In such an example, the sending device (located in New York) may be spoofing the IP address of a device in Colorado. The filter applied to the ingress router may block the network traffic from the sending device in New York while not blocking network traffic from the device in Colorado. In some aspects, the filter used to block network traffic from the sending device in New York may be propagated (or otherwise distributed) to one or more alternate devices in the computing environment. As a result, the network traffic from the sending device in New York may be blocked by multiple devices in the computing environment. However, the filter(s) used to block network traffic from the sending device in New York will not affect the network traffic from the device in Colorado.

FIG. 4 illustrates an exemplary suitable operating environment for the routing scope restriction techniques described herein. In its most basic configuration, operating environment 400 typically includes at least one processing unit 402 and memory 404. Depending on the exact configuration and type of computing device, memory 404 (storing, instructions to perform the techniques disclosed herein) may be volatile (such as RAM), non-volatile (such as ROM, flash memory, etc.), or some combination of the two. This most basic configuration is illustrated in FIG. 4 by dashed line 406. Further, environment 400 may also include storage devices (removable, 408, and/or non-removable, 410) including, but not limited to, magnetic or optical disks or tape. Similarly, environment 400 may also have input device(s) 414 such as keyboard, mouse, pen, voice input, etc. and/or output device(s) 416 such as a display, speakers, printer, etc. Also included in the environment may be one or more communication connections 412, such as LAN, WAN, point to point, etc. In embodiments, the connections may be operable to facility point-to-point communications, connection-oriented communications, connectionless communications, etc.

Operating environment 400 typically includes at least some form of computer readable media. Computer readable media can be any available media that can be accessed by processing unit 402 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

The operating environment 400 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments are described herein, the scope of the technology is not limited to those specific embodiments. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A system comprising:

at least one processor; and memory coupled to the at least one processor, the memory comprising computer executable instructions that, when executed by the at least one processor, cause the system to perform a method, the method comprising:

receiving, at a receiving device, network traffic information from a sending device, wherein the network traffic information comprises a source IP address;

evaluating the network traffic information to determine the source IP address is being used illegitimately;

in response to determining the source IP address is being used illegitimately:

identifying at least one ingress router of a network receiving network traffic that identifies the source IP address;

determining at least one transmission path within the network for the network traffic;

ranking multiple devices along the transmission path based on closest proximity of the filter device to the ingress router, wherein the closest proximity is a combination of geographical proximity to the receiving device and logical proximity to the receiving device; and identifying a filter device based at least on the ranking; and applying a filter to the filter device, wherein the filter is configured to block at least a portion of the network traffic information from the sending device.

2. The system of claim 1, wherein the filter device comprises an edge device of a network that includes the receiving device, wherein the filter device comprises, or operates in conjunction with, an ingress router for the network.

3. The system of claim 1, wherein the network traffic information comprises data from IP packets addressed to a destination device, and wherein the filter device comprises a device that is different from both the receiving device and the destination device.

4. The system of claim 2, wherein identifying the filter device comprises determining that the filter device includes sufficient processing capability to apply the filter.

5. The system of claim 4, wherein the network comprises multiple intermediate devices between the ingress router and the destination device that include sufficient processing capability to apply the filter.

6. The system of claim 1, wherein the method further comprises determining, for the IP packet, an expected egress router, wherein the network traffic information comprises an IP packet and the network traffic information comprises identification of both the ingress router and an actual egress router for the IP packet, and wherein evaluating the network traffic information to determine the source IP address is being used illegitimately comprises determining that network traffic is being asymmetrically routed.

7. The system of claim 6, wherein evaluating the network traffic information to determine the source IP address is being used illegitimately comprises determining that network traffic is being asymmetrically routed is further based on detecting an increase in the network traffic exceeding a threshold.

8. The system of claim 1, wherein evaluating the network traffic information to determine the source IP address is being used illegitimately comprises determining that the source IP address is associated with a geographic location inconsistent with an expected geographic location based on a location of the receiving device.

9. The system of claim 1, wherein evaluating the network traffic information to determine the source IP address is being used illegitimately comprises determining that the network traffic information indicates network traffic that is anomalous based on the source IP address and historical behavioral data, wherein historical behavioral data comprises a measure of network traffic based on both time and location for the source IP address.

10. The system claim 1, wherein the method further comprises ranking multiple devices in a transmission path for network traffic based on at least proximity to the ingress router and processing capability of the multiple devices, wherein the filter device comprises one of the ranked multiple devices.

11. A method, comprising:

receiving, at a receiving device, network traffic information from a sending device, wherein the network traffic information comprises a source IP address;

evaluating the network traffic information to determine the source IP address is being used illegitimately;

in response to determining the source IP address is being used illegitimately:

identifying at least one ingress router of a network receiving network traffic that identifies the source IP address;

determining at least one transmission path within the network for the network traffic;

ranking multiple devices along the transmission path based on closest proximity of the filter device to the ingress router, wherein the closest proximity is a combination of geographical proximity to the receiving device and logical proximity to the receiving device;

identifying a filter device based at least on the ranking; and applying a filter to the filter device, wherein the filter is configured to block at least a portion of the network traffic.

12. The method of claim 11, wherein the filter device comprises an edge device of a network that includes the receiving device, wherein the filter device comprises, or operates in conjunction with, an ingress router for the network.

13. The method of claim 11, wherein the network traffic information comprises data from IP packets addressed to a destination device, and wherein the filter device comprises a device that is different from both the receiving device and the destination device.

14. The method of claim 12, wherein identifying the filter device comprises determining that the filter device includes sufficient processing capability to apply the filter.

15. The method of claim 14, wherein the network comprises multiple intermediate devices between the ingress router and the destination device that include sufficient processing capability to apply the filter, further comprising ranking multiple devices in a transmission path for network traffic based on at least proximity to the ingress router and processing capability of the multiple devices, wherein the filter device comprises one of the ranked multiple devices.

16. The method of claim 11, further comprising determining, for the IP packet, an expected egress router, wherein the network traffic information comprises an IP packet and the network traffic information comprises identification of both the ingress router and an actual egress router for the IP packet, and wherein evaluating the network traffic information to determine the source IP address is being used illegitimately comprises determining that network traffic is being asymmetrically routed.

17. The method of claim 16, wherein evaluating the network traffic information to determine the source IP address is being used illegitimately comprises determining that network traffic is being asymmetrically routed is further based on detecting an increase in the network traffic exceeding a threshold.

18. The method of claim 11, wherein evaluating the network traffic information to determine the source IP address is being used illegitimately comprises determining that the network traffic information indicates network traffic that is anomalous based on the source IP address and historical behavioral data, wherein historical behavioral data comprises a measure of network traffic based on both time and location for the source IP address.

19. The method of claim 11, further comprising ranking multiple devices in a transmission path for network traffic based on at least proximity to the ingress router and processing capability of the multiple devices, wherein the filter device comprises one of the ranked multiple devices.

* * * * *